US012700195B2

(12) United States Patent
Marquínez Torrecilla et al.

(10) Patent No.: US 12,700,195 B2
(45) Date of Patent: Aug. 4, 2026

(54) METHOD FOR SIMULATING AND TRAINING FOR VISUAL INSPECTION OPERATIONS IN VIRTUAL OR AUGMENTED REALITY ENVIRONMENTS AND SYSTEM FOR IMPLEMENTING SAID METHOD

(71) Applicant: SEABERY NORTH AMERICA INC., Annapolis, MD (US)

(72) Inventors: Pedro Marquínez Torrecilla, Severna Park, MD (US); José Alfonso Jímenez, Canamero (ES)

(73) Assignee: SEABERY NORTH AMERICA INC.

( * ) Notice: Subject to any disclaimer, the term of this patent is extended or adjusted under 35 U.S.C. 154(b) by 113 days.

(21) Appl. No.: 18/693,798

(22) PCT Filed: Sep. 20, 2022

(86) PCT No.: PCT/ES2022/070599
§ 371 (c)(1),
(2) Date: Mar. 20, 2024

(87) PCT Pub. No.: WO2023/041832
PCT Pub. Date: Mar. 23, 2023

(65) Prior Publication Data
US 2025/0139912 A1      May 1, 2025

(30) Foreign Application Priority Data
Sep. 20, 2021     (ES) ................................ ES202130874

(51) Int. Cl.
*G06T 19/00* (2011.01)
*G06T 19/20* (2011.01)

(52) U.S. Cl.
CPC .......... *G06T 19/006* (2013.01); *G06T 19/003* (2013.01); *G06T 19/20* (2013.01); *G06T 2219/2004* (2013.01)

(58) Field of Classification Search
CPC ..... G06T 19/006; G06T 19/003; G06T 19/20; G06T 2219/2004
(Continued)

(56) References Cited

U.S. PATENT DOCUMENTS 12,254,786 B2* 3/2025 Gilchrist ............... G06T 19/006
2011/0256515 A1 10/2011 Miller et al.
(Continued)

FOREIGN PATENT DOCUMENTS

EP          1452949 A1      9/2004
WO     2018200692 A1     11/2018

*Primary Examiner* — Thomas J Lett
(74) *Attorney, Agent, or Firm* — Daylight Law, P.C.

(57) ABSTRACT

A method provides for simulating and training for visual inspection operations in virtual or augmented reality environments, suitable for use in simulating investigation reports, evidence inspection or forensic examination. Said method includes the interaction of a user with one or more objects. The interactions with an object can be either direct or indirect, or can include one or more operations of marking the environment. Said interactions are detected by actuators and/or sensors and are represented on visual display equipment, thereby allowing the user to view the same. Lastly, the operations performed by the user are compared to a sequence of reference operations, the user receiving a score on the basis of the same. A system is provided for implementing the aforementioned method.

14 Claims, 10 Drawing Sheets

```
200
    ┌─────────┐
    │   201   │
    └─────────┘

┌─────────┐
    │   202   │
    └─────────┘
```

(58) Field of Classification Search
USPC ......................................................... 345/633
See application file for complete search history.

(56) References Cited

U.S. PATENT DOCUMENTS

| | | | |
|---|---|---|---|
| 2018/0090029 A1 | 3/2018 | Fisher et al. | |
| 2020/0066173 A1 | 2/2020 | Wallace et al. | |
| 2020/0409452 A1* | 12/2020 | Nguyen | G06T 19/20 |
| 2023/0267849 A1* | 8/2023 | Gilchrist | G09B 9/307 |
| | | | 434/36 |

* cited by examiner

METHOD FOR SIMULATING AND TRAINING FOR VISUAL INSPECTION OPERATIONS IN VIRTUAL OR AUGMENTED REALITY ENVIRONMENTS AND SYSTEM FOR IMPLEMENTING SAID METHOD

CROSS-REFERENCE TO RELATED APPLICATIONS AND PRIORITY

This patent application claims priority from PCT Application No. PCT/ES2022/070599 filed Sep. 20, 2022, which claims priority from Spanish Patent Application No. P202130874 filed Sep. 20, 2021. Each of these patent applications are herein incorporated by reference in their entirety.

FIELD OF THE INVENTION

The present invention generally relates to a method and an augmented or virtual reality system, and more specifically, for simulating visual inspection operations. Said system is suitable in the educational field, for the teaching of protocols for the inspection of scenarios in various applications, for example, forensic technique, investigation reports or inquiry proceedings.

BACKGROUND OF THE INVENTION

The present invention falls within the field of augmented reality (AR) and virtual reality (VR). Although augmented reality and virtual reality are generally considered different immersive environments, they will be used interchangeably in the present invention. Thus, any reference made to augmented reality will also be considered to refer to augmented reality, and vice versa. Specifically, this invention relates to the simulation in AR/VR of visual technical inspection methods, such as those performed in an emergency situation (accidents, investigation reports) or in the inspection of a crime scene or forensic methods.

There are some systems in the prior art that have addressed visual technical inspection operations. For example, patent application US20110256515A1 describes a system for training a user in various operating protocols (forensic medicine, scientific methods, weapons handling, etc.). However, that system requires a real physical environment, as well as the deployment of a large amount of resources and furniture, which limits the number of different scenarios and protocols with which the user can practice. Furthermore, said system is not portable, so it means that the user must travel to wherein the system is located for the training.

Multiple AR or VR simulators are also known in the prior art. In the particular case of forensic applications, there is a simulator created by the company Staples Virtual Reality, which comprises the use of LIDAR (Light Detection and Ranging) devices. However, this simulator provides very limited user interactions with virtual objects. For example, the handling of virtual objects does not include a realistic representation of the user's hands, including the precise positioning of the fingers and the force applied during handling, which prevents the reliable simulation of certain operating protocols (taking prints, using swabs, etc.).

Therefore, it is evident that there is a need in the prior art to provide a system capable of improving the training of users in visual technical inspection tasks. Visual technical inspection requires complex scenarios, the performance of multiple tasks (tracking, extracting evidence, etc.), the use of chemicals and the availability of different scenarios to provide proper training for users. Moreover, it is desirable to avoid the difficulties inherent to the deployment of infrastructure and security risks that could arise in a real physical training environment.

The present invention solves the above difficulties by providing a system for training for visual technical inspection operations based on AR/VR simulation that is safe, realistic, portable and allows for easy reconfiguration of the scenario.

BRIEF DESCRIPTION OF THE INVENTION

The present invention falls within augmented reality (AR) or virtual reality (VR) systems and allows solving the limitations of the prior art mentioned in the above section, especially with regard to providing greater realism in the user's interactions with the objects. Specifically, the invention corresponds to a computer-implemented method and system for training in visual technical inspection operations, including crime scene investigation, investigation reports and inquiry proceedings. As a result of the use of AR/VR, unlimited practice can be performed from the point of view of a user who needs to learn a visual inspection protocol in a controlled, realistic and safe manner. Furthermore, the use of AR/VR allows avoiding space limitations, since large scenarios can be simulated in a small room.

More specifically, a main object of the present invention relates to a method for simulating and training for visual inspection operations in virtual or augmented reality environments, suitable for use in simulating operations of investigation reports, evidence inspection or forensic examination performed in a physical space, comprising:

Generating, by means of a virtual or augmented reality visual display equipment, a simulation environment representing a physical space. Said virtual display equipment may comprise a screen or monitor suitable for viewing.

Defining at least one avatar of a user in the simulation environment by means of the visual display equipment.

Defining a set of objects in the simulation environment, wherein said objects are representations of physical objects with which the user can interact in said simulation environment. These representations are visually recognizable by the user and comprise simple geometric shapes, stylized representations of objects (stylized, caricatured, drawings) or even photorealistic representations, among other types. The objects can be purely virtual objects (in the case of a virtual reality representation) or real objects (in the case of augmented reality).

The simulated physical space can be predefined by an external user (preferably a teacher or instructor), who supervises the sequence of operations performed by one or more users (students). The teacher uses a scenario generator module to create, select, choose and modify among the predefined scenarios depending on the needs of the group of users. The scenario generator allows deciding the structure of the scenario (for example, geometry of a scenario, location of different objects in said scenario, etc.).

Alternatively, the scenario can be selected by the user (student) from a variety of possible predefined scenarios.

Advantageously, the method for simulating and training for visual inspection operations of the invention further comprises performing the following steps:

Defining, in a processing equipment connected to the visual display equipment, a reference sequence of operations associated with interaction of the avatar with one or more objects by means of one or more actuators or controllers (such as a joystick, haptic gloves, augmented reality flashlight, or tweezers for picking up objects from the scenario) and/or sensors, wherein said operations comprise at least one or more direct interactions with an object, one or more indirect interactions with an object, one or more operations of marking the simulation environment, and an order of execution of two or more operations of the reference sequence of operations.

Showing to the user the simulation environment by means of the visual display equipment and the user performing a sequence of operations associated with the interaction of the avatar with one or more objects by means of one or more actuators (controllers) and/or sensors, wherein said operations comprise at least one or more direct interactions with an object, one or more indirect interactions with an object, one or more operations of marking the simulation environment, and the order of execution of two or more operations of the sequence of operations.

Detecting, by means of the actuators and/or sensors and the visual display equipment, the sequence of operations performed by the user;

Recording, with the processing equipment, the sequence of operations performed by the user and calculating the similarity of said sequence of operations with respect to the reference sequence of operations.

There is not always a single correct sequence of operations. The order in which said operations are carried out is binding in some cases, while in other cases what is relevant is that all the operations are completed. For example, if there are several objects that act as evidence in a simulation environment, what matters is that all of those evidence are processed or that the user performs certain interactions with all of them, optionally being able to choose the order in which to process said evidence. In contrast, in other operations that the user performs in the system (for example, leaving the scenario, delimiting a passageway or subset of the simulation environment, or how to move around evidence found in an access passageway to the scenario), the order in which they are performed is critical and determines the outcome of the simulation.

In preferred embodiments of the invention, the method comprises calculating, by means of the processing equipment, a meta-path in the simulation environment comprising a set of points of said simulation environment at which the user has performed one or more operations in the virtual space, or a set of points through which the user's avatar has moved in the virtual space.

In other preferred embodiments of the invention, the method further comprises graphically representing the meta-path in the simulation environment by means of the visual display equipment; recording one or more user's operations in the simulation environment and/or reproducing one or more of said operations. Recording the operations optionally comprises recording the interactions made by at least one user, either from his or her point of view or from an external point of view (for example, eagle-eye type or, if there are a plurality of users in the simulation environment, from the point of view of another user). The recorded content (for example, a video or video and audio recording) can be processed by software means that allow it to be synchronized with the sequence of interactions that have been recorded for the user.

In certain preferred embodiments of the invention, the method further comprises:

Generating a random distribution of a set of objects in the simulation environment by means of the processing equipment; wherein said objects comprise one or more properties, one of said properties consisting of the visibility or not of said object in the simulation environment. This distribution of objects may also be predetermined by a method for generating scenes within the simulation environment or by a user external to the system (for example, an instructor).

Representing, by means of the visual display equipment and according to the distribution generated in the preceding step, a subset of objects in the simulation environment that are visible.

In some embodiments of the invention, the method is applied for simulating and training for visual inspection operations assisted by artificial illumination (for example, by a virtual object simulating to be a flashlight carried by the avatar), and further comprises performing the following steps:

Calculating, by means of the processing equipment, the distance and/or direction of observation from the user's avatar to an object.

Calculating, by means of the processing equipment, the distance and/or direction of illumination from virtual illumination means carried by the user's avatar to the object; wherein said virtual illumination means comprise an artificial illumination source suitable for illuminating the simulation environment and, optionally, one or more optical filters.

Representing, by means of the visual display equipment, an illumination result in the simulation environment selected from a plurality of results dependent on the distance and/or direction of observation and the distance and/or direction of illumination. For example, a certain object (for example, evidence such as a print) may only become visible to the user in the simulation environment if the user illuminates it with a flashlight at a short distance or from a certain angle.

In other embodiments of the invention, the method is applied for simulating operations of marking paths or areas of interest in a virtual environment, and further comprises performing these steps:

Defining, by means of interaction of the avatar with the simulation environment, a plurality of virtual signaling points in said simulation environment. Preferably, said points are delimited in the simulation environment by means of virtual dashed lines or another type of representation that serves as a guide for the user.

Representing, at the virtual signaling points defined in the preceding step, corresponding virtual signaling markers (for example, beacon type markers), wherein said objects have one or more physical interaction properties in the simulation environment (for example, changes in visibility or state of said beacons depending on certain interactions with the simulation environment).

Defining a virtual path, for example, between two or more contiguous virtual signaling markers.

Graphically representing said virtual path as a meta-path in the simulation environment that delimits a subset of points of the simulation space.

In still more preferred embodiments of the invention, the method for simulating operations of marking paths or delimiting areas of interest in the virtual environment comprises detecting, by means of the processing equipment, the handling of one or more objects existing in the virtual path. Said handling includes verifying the occurrence of collisions, recording which objects of interest are inside and outside the delimited paths, as well as verifying whether or not the user has executed certain actions with respect to the objects. Collisions occur when the virtual path overlaps with the position of an object in the simulation environment or with the avatar of one of the users. In particular, these embodiments can be used in delimiting passageways or accesses to a room of the virtual environment.

In other embodiments of the invention, the method is applied for simulating operations of taking fingerprints and/or tracking footprints (or another object) in a virtual environment, and further comprises performing the following steps to process objects:

Applying one or more objects, said objects comprising at least virtual illumination means (for example, a flashlight) and/or object handling tools (for example, a swab or a reagent), to a subset of points in the simulation environment to modify the visibility of a new object located in said subset of points in the simulation environment. For example, sometimes the use of virtual illumination means is not necessary if the object is visible to the naked eye with the existing natural light in the scenario.

Optionally, transferring said new virtual object to storage containers for said virtual objects (for example, virtual boxes for each type of virtual object: biological evidence, etc.). Other objects are processed and do not require storage.

In the case of tracking, evaluating the efficiency of said tracking. For example, information about which surfaces in the simulation environment have been examined by the user and with which tools they have been tracked can be obtained.

In some embodiments of the invention, the method is applied to the simulation of operations of acquiring one or more images (in photographic or video format) and metadata from the simulation environment, and further comprises performing these steps:

Selecting at least one of the objects as image acquisition means (for example, a photographic camera).

Configuring a type of image, and optionally an optical filter (ultraviolet, infrared, etc.), and applying this configuration to the image acquisition means. Depending on the type of evidence to be processed in the simulation environment, an image type and a certain filter will be used. The image acquisition means have various types of capture, such as panoramic mode, tripod mode, or others, depending on the field of view to be recorded.

Positioning the avatar at a distance from the subset of the simulation environment, and with the direction of observation with which the image(s) will be taken.

Capturing an image of the subset of the simulation environment that is in the field of view of the configured image acquisition means. This image comprises additional information (metadata) of the objects in the image. Metadata are additional information of the relevant objects (evidence, etc.) that are in the image of the scenario. Said metadata comprises, for example, indications as to whether all the required evidence are present in a photo, or whether the suitable illumination filter has been applied.

Preliminarily evaluating the captured image according to one or more quality criteria set by the user (or predefined by the simulator) and the metadata of the objects included in the image.

The above steps can be repeated iteratively until the preliminary evaluation exceeds the quality requirements set by the user.

Some criteria for the preliminary evaluation of quality may be: that one or more objects (for example, evidence) are fully visible in the image without the need to zoom in, that a photo evidence scale appears next to the object in the same image to allow checking its dimensions, etc. In cases where the captured image does not meet the quality standards, the method may also comprise indicating to the user which parameters of the configuration of the acquisition means (for example zoom, image type, filter) would be suitable. The preliminary evaluation is essential when simulating methods where images cannot be edited (cropped, enlarged or retouched) in any way at a later time, for example, if they are to be used as evidence before a judge. If the captured image does not meet said criteria, the above steps may be chosen to be iteratively repeated until the image or images in the simulation environment are suitable.

In some embodiments of the invention, the method further comprises generating a score of the user's performance depending on the similarity of the user's operations and the reference sequence of operations. Additionally, the score may or may not take into account the observance of a certain order in performing the sequence of operations if the order in which the operations are performed is relevant. Depending on said score, or on the order of performance followed, it is possible to show the user indications or assistance during the simulation in order to guide the operations performed, which may vary, in different execution modes (for example, being different if the user is doing free exercise or if the user is being examined).

In certain embodiments of the invention, the method further comprises defining a plurality of users cooperatively interacting in the same simulation environment. Optionally, a role is assigned to each user, such that the sequence of operations comprises one or more interactions allowed for said user with respect to objects and/or other users depending on their role. For example, in the case of multiple users, one user may be in charge of documenting evidence during the simulation, while another may be in charge of imaging the simulation environment. In other embodiments, all users could perform the required sequence of operations cooperatively. It should be noted that all users are synchronized in the simulation environment.

A second object of the invention disclosed in the present application relates to an augmented or virtual reality system operating according to any of the embodiments of the described method. Said system comprises the following elements:

An augmented or virtual reality visual display hardware equipment configured to generate and show a simulation environment to the user. For example, some possible commercial hardware implementations for the visual display equipment are Oculus Quest or Microsoft Hololens.

One or more actuators (controllers) and/or sensors comprising at least position and/or haptic sensors configured to record information about actions performed by one or more users in the physical world representing interactions in the simulation environment.

A processing equipment comprising an information storage module configured to store the reference sequence of operations and all interactions performed by one or more users in the simulation environment; and an evaluation module configured to compare the similarity between the reference sequence of operations and the operations performed by each user. The storage module will preferably comprise a database.

Advantageously, the processing equipment of the augmented or virtual reality system comprises a virtual or augmented reality simulation generation module for implementing the method for simulating and training for visual inspection operations as described above.

In preferred embodiments of the invention, the system comprises the following elements:

Means for recording and reproducing audio (for example, a microphone for recording audio), suitable for allowing the interaction of the user with the simulation environment.

Means for external viewing of the simulation environment suitable for allowing the viewing of the simulation environment and of the operations performed by a user to other different users.

Means of communication allowing the transmission of information stored and/or processed by the processing equipment to external devices or remote locations through telematic networks. Said means of communication may comprise a computer (CPU, Computer Processing Unit), microcontroller, CPU or analogous devices.

Feedback module, which allows monitoring the progress of students, as well as testing and evaluating them, by evaluating the sequence of operations performed by the user and comparing it to a reference sequence of operations (for example, according to a certain protocol). The feedback module is suitable for recording information from the users during the performance of operations in the simulation environment (1). Furthermore, the feedback module comprises an educational web platform that records the errors made by the user during the simulation, as well as the score achieved, which is computed from the recorded information from the user. Therefore, this feedback module functions as an e-learning platform and comprises the hardware/software means necessary to manage the users of the system (registrations and cancellations), scores, group management, scenario assignment, sending comments to users, etc. In this case, the feedback module comprises a communication with the scenario generator, so that the teacher selects which of the scenarios are available to a certain user, and in which circumstance (for example depending on the user's skills or the group to which that student belongs). Therefore, when the user (student) puts on the hardware (viewer) of the simulator, said user can choose from a plurality of scenarios that the teacher has configured for him.

In still more preferred embodiments of the invention, the augmented or virtual reality system additionally comprises a module for recording and reproducing information suitable for:

Generating a record (comprising images, video and/or audio, as well as image metadata) from the point of view of one or more users of the simulation environment, of the set of operations performed by one or more users of the simulation environment. This record comprises, for example, a recording with audio/video that allows the subsequent reproduction of the actions performed by the user, even from other points of view different from the point of view with which the user performed them. Alternatively, said record comprises a plurality of metadata suitable for reconstructing the sequence of operations performed by the user, or comprises both an audiovisual recording and metadata.

Optionally, synchronizing said record with the set of operations performed by one or more users of the simulation environment. By synchronizing the recording and the sequence of operations executed by the user, the system allows subsequently providing feedback to said user about the score obtained, as will be indicated below.

Optionally, reproducing said recording.

In certain embodiments of the invention, the user feedback module is configured to:

Calculate a score according to the similarity between the reference patterns and the operations performed by the user.

Providing a plurality of indications to the user of those interactions different from those comprised in the reference sequence of operations; said indications comprising at least one of the following: time used for interactions with the objects, total time used for performing the operations, incorrect order of performing the sequence of operations, number of objects stored.

The system of the invention thereby presents a remote functionality, wherein several users in different physical locations (interacting with each other or not) are included in the same simulation environment. The feedback system allows users to be managed as a remote educational (classroom) environment, wherein a teacher can review the operations performed by one or more users in the simulation environment. The teacher can assist them remotely and can review the operations carried out by each user after the activity has been performed, for example, by reproducing said operations again (even from another point of view).

In certain preferred embodiments of the invention, the avatar comprises a realistic representation of the position of the user's fingers, as a result of the information acquired by one or more haptic sensors (for example, gloves) worn by the user in the physical world. In this way, the handling of certain objects by the user is highly relevant for the score that the system assigns to the sequence of operations performed by the user. In particular, it is possible to simulate certain operations such as the handling of biological evidence (for example, extracting prints in a forensic scenario) wherein the position of the fingers, the force applied and the duration of the handling are critical factors in determining whether the evidence is successfully extracted or irreversibly damaged.

Throughout the text, the word "comprises" (and its derivatives) should not be understood in an exclusive way, but should be understood in the sense that they allow for the possibility that what is defined may include additional elements or steps. Furthermore, within the scope of the invention when reference is made to "optical" filters it is not intended to be limited to the "visible" electromagnetic spectrum, but any portion of said spectrum may be used (ultraviolet, infrared, etc.).

Likewise, the concept of "avatar" shall be understood in a broad manner, as any virtualized representation of a user or any part of the user's body (for example, it could be only the hands or also include the feet), and even any other type of symbolic representation of said user (a cursor indicating the user's position in the simulation environment, only a representation of one or more tools the user handles, etc.).

Within the scope of this invention, a "meta-path" in the simulation environment shall be understood as a set of points in said environment at which the user has performed one or more operations in the virtual space, or a set of points traversed by the user's avatar during the performance of said operations. The "meta-path" is a purely virtual entity that lacks a physical equivalent. In contrast, virtual objects are always representations of physical objects with an equivalent in the physical world.

Moreover, in the description and claims of the present application, the concept "object" will refer to both a real object and a virtual object in cases where this term is not accompanied by any clarification. By the context of the invention, "objects" will be purely virtual in the case of using a VR viewer, but could also be real objects if an AR viewer is involved.

The system of the invention comprises one or more AR/VR viewers. While the invention will primarily refer to personal viewers that are worn by the user, such as glasses, or AR/VR helmets, any monitor or screen (for example, a screen of a computer, mobile device, tablet or television) that allows the AR/VR environment to be displayed will also be considered included within the scope of interpretation of this term.

DESCRIPTION OF THE FIGURES

To complete the description of the invention a set of figures is provided, forming an integral part of the description and illustrating a preferred embodiment of the invention. Said figures are to be interpreted in an illustrative, non-limiting manner, and are detailed below.

FIGS. 1-2 are accompanied by a series of reference numbers corresponding to the following elements:

(100) Simulation system.
(101) Visual display equipment.
(102) User.
(103) Joystick.
(104, 200) Processing equipment.
(201) Information storage module.
(202) Evaluation module.

Figure 3:
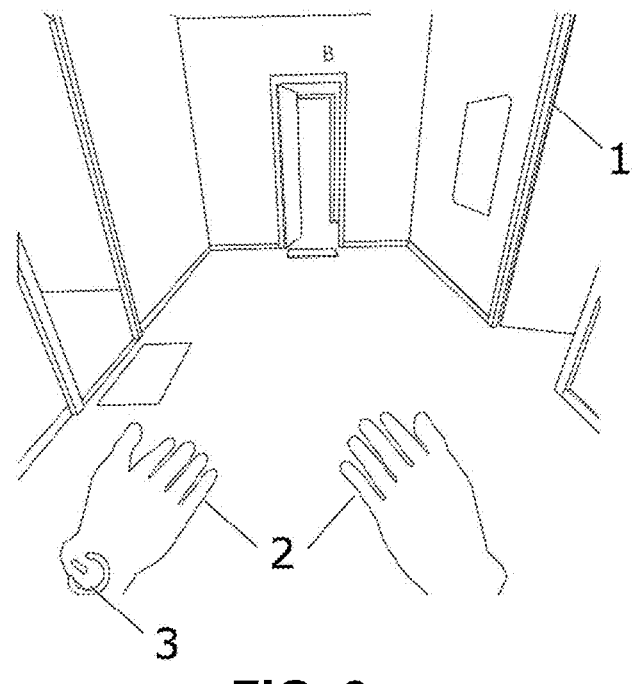

FIG. 3 shows an example of the interface of the system of the invention observed by the user.

Figure 4:
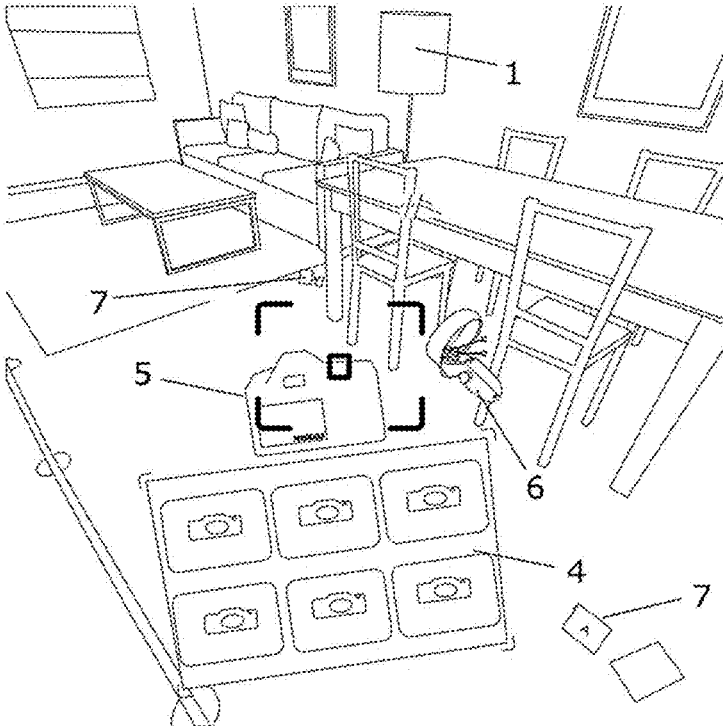

FIG. 4 represents the drop-down options menu when the user activates the functionality of acquiring one or more images of the simulation environment.

Figure 5:
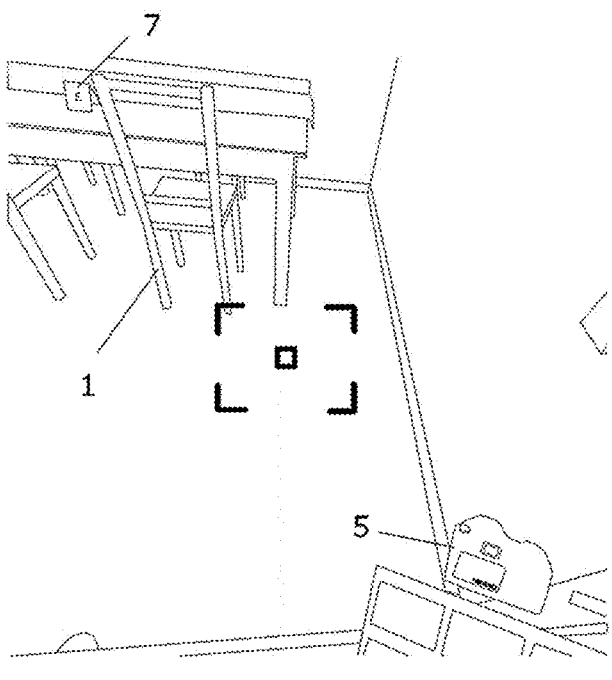

FIG. 5 shows how, once the configuration of the virtual camera is chosen, the drop-down menu closes to facilitate focusing and selection of the field of view to be captured.

Figure 6:
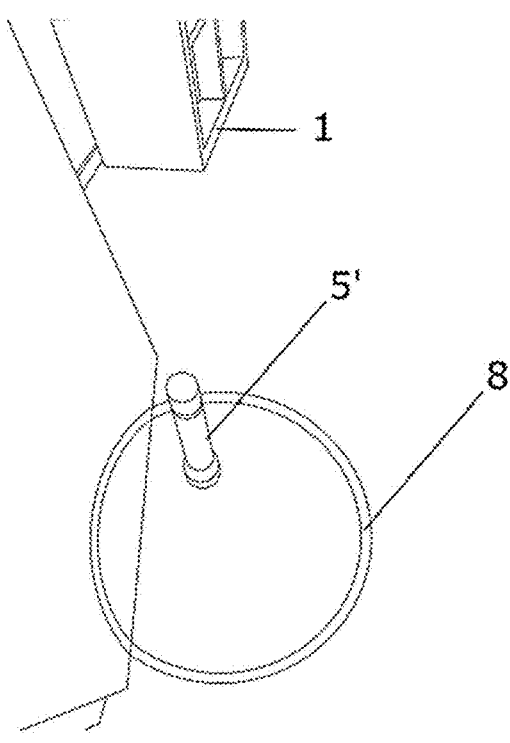

FIG. 6 illustrates the functionality for simulating simulation and training for visual inspection operations assisted by artificial illumination, in this case a virtual flashlight.

Figure 7:
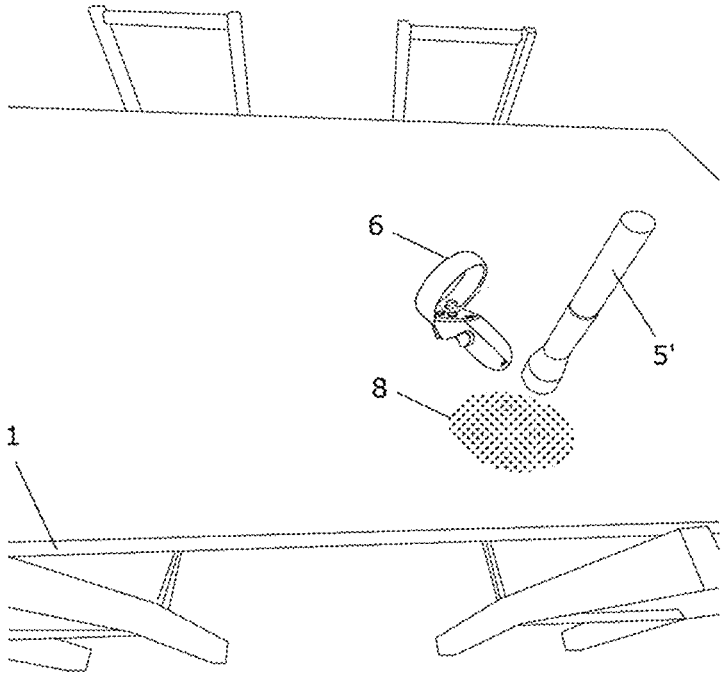

FIG. 7 corresponds to the functionality of visual inspection assisted by visual illumination, wherein the flashlight is applied to a surface of the simulation environment, in this case a table.

Figure 8:
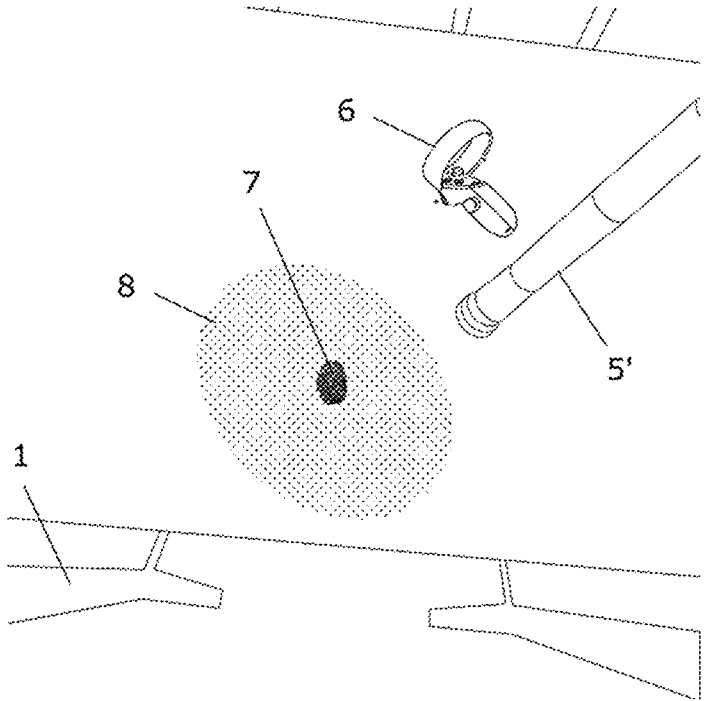

FIG. 8 represents the same scenario as FIG. 7, with the difference that the user has modified the configuration of the flashlight (particularly the distance and angle of illumination), which has allowed the user to reveal hidden evidence.

Figure 9:
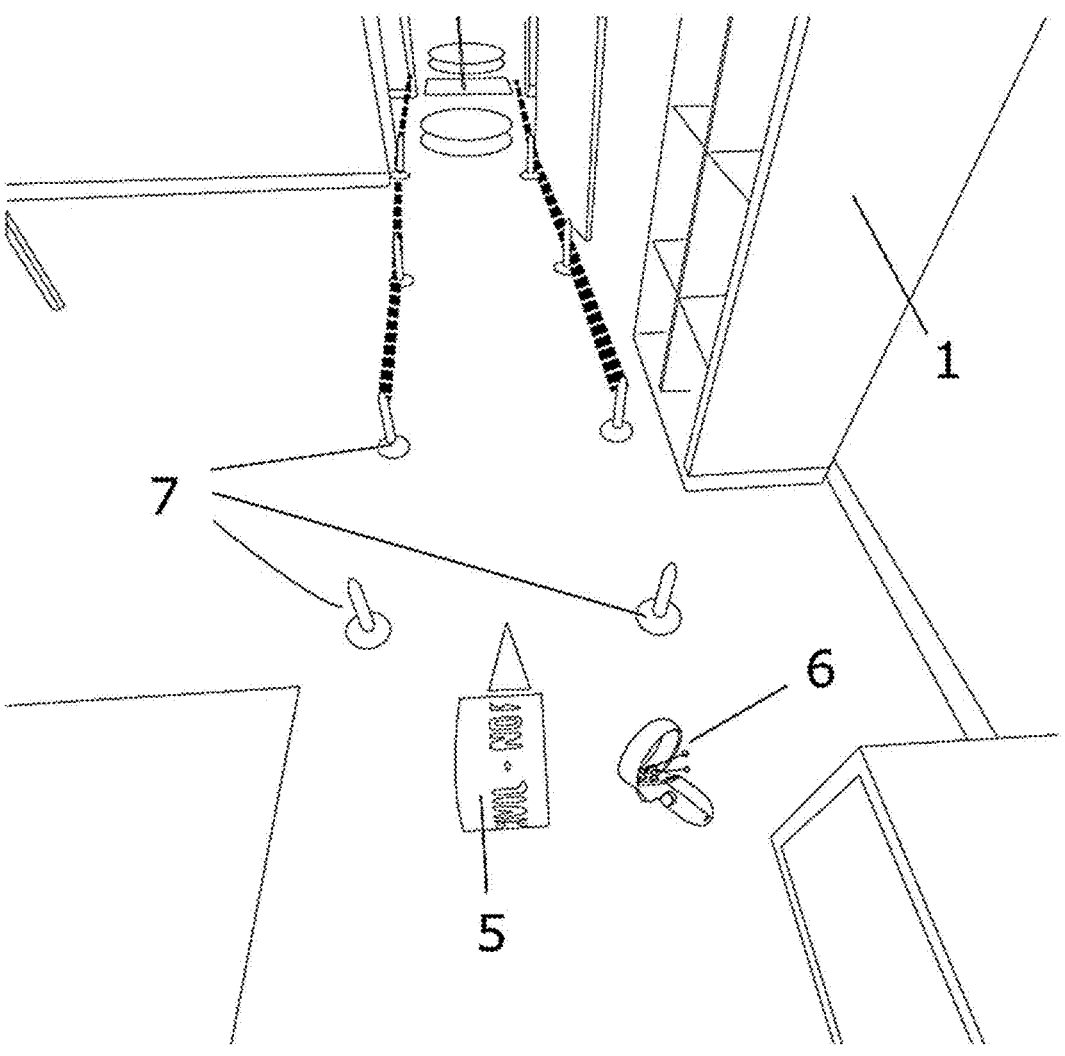

FIG. 9 represents the interface of the system for simulating operations of marking paths or delimiting areas of interest in a virtual environment.

FIGS. 3-9 are accompanied by a series of reference numbers corresponding to the following elements:

(1) Simulation environment (from RA/RV).
(2) User's avatar
(3) Startup icon for the interface of the system.
(4) Drop-down menu.
(5) Virtual tool.
(5') Virtual artificial illumination means.
(6) Joystick.
(7) Virtual objects.
(8) Volume of action of the tool.

Figure 10:
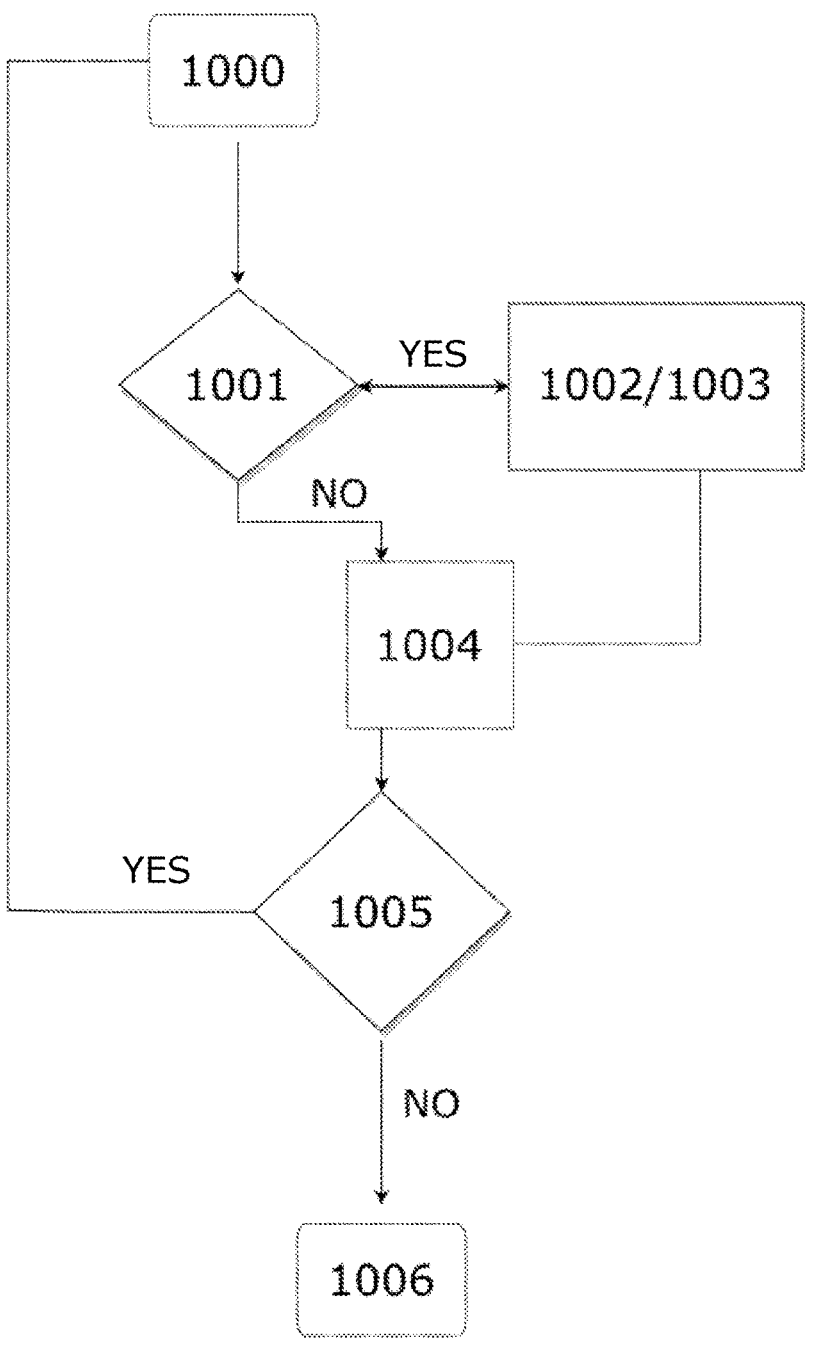

FIG. 10 corresponds to a diagram of the method for creating spaces in the simulation environment.

Figure 11:
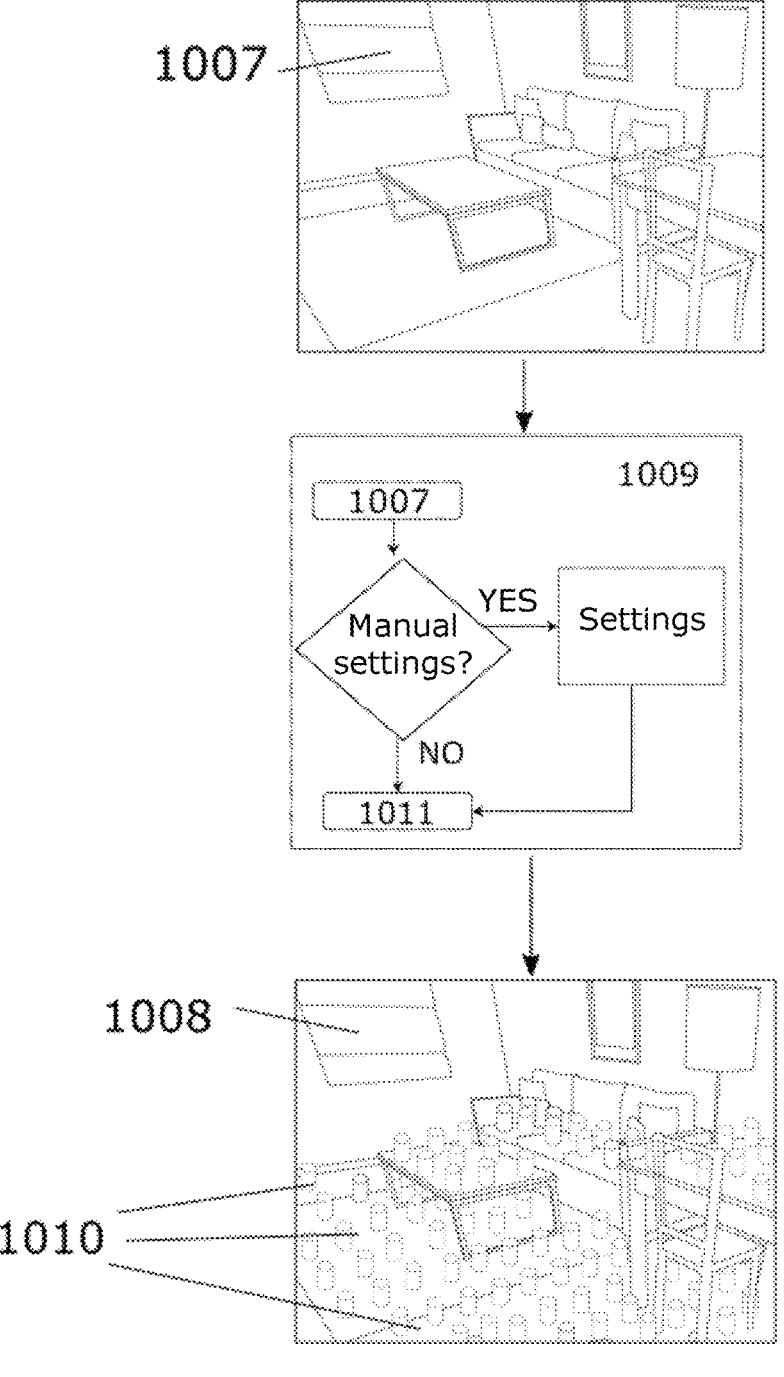

FIG. 11 shows a diagram of the method for configuring the spaces created according to the method in FIG. 10.

Figure 12:
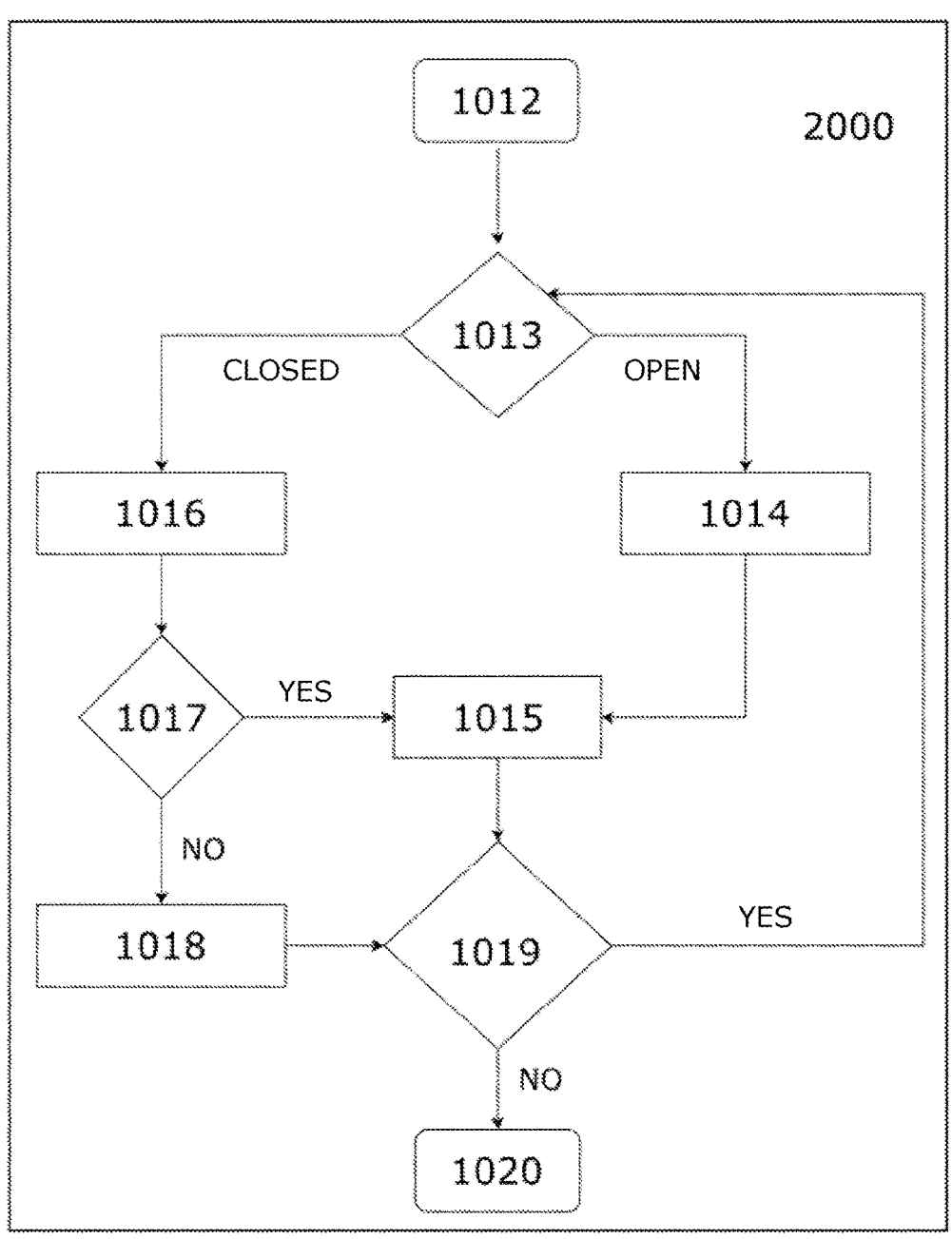

FIG. 12 represents the method for delimiting areas of interest.

Figure 13:
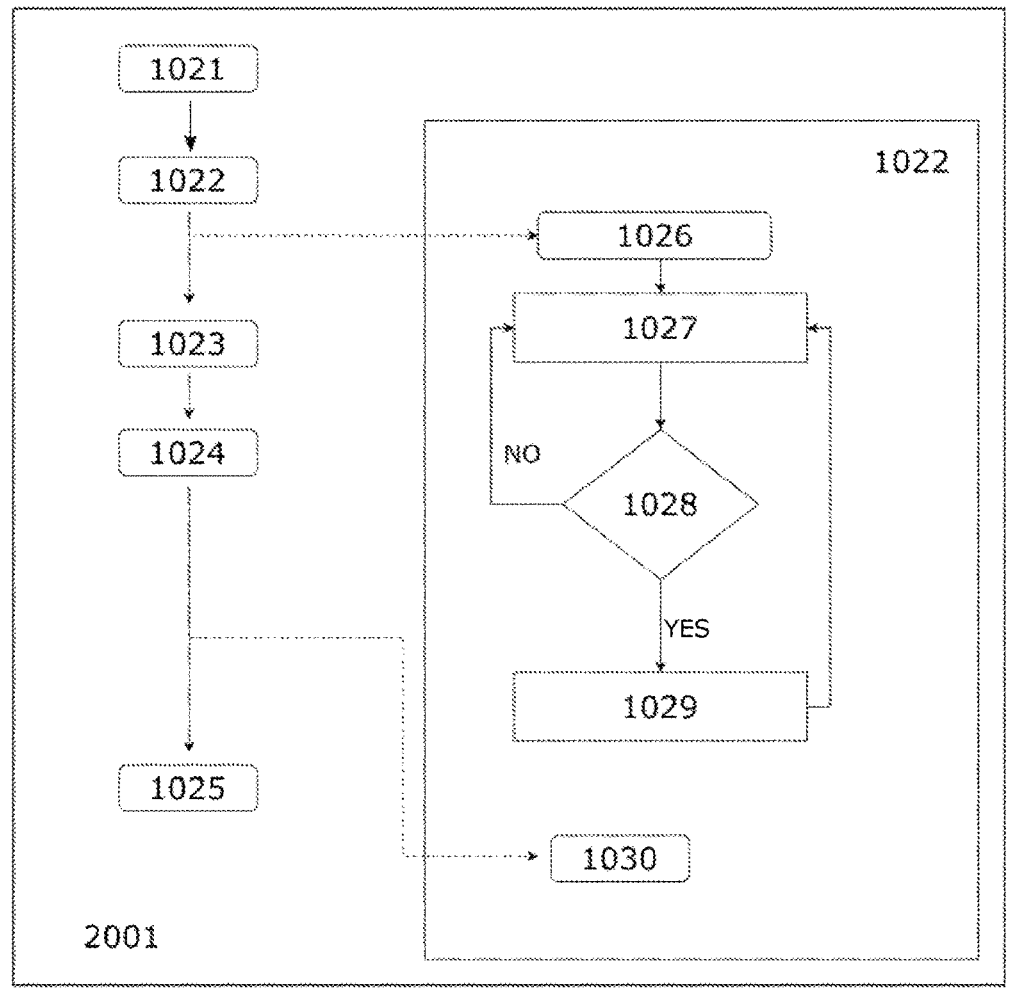

FIG. 13 shows the operation of the tracking tool and how it interacts with the beacons during the operations of tracking.

Figure 14A:
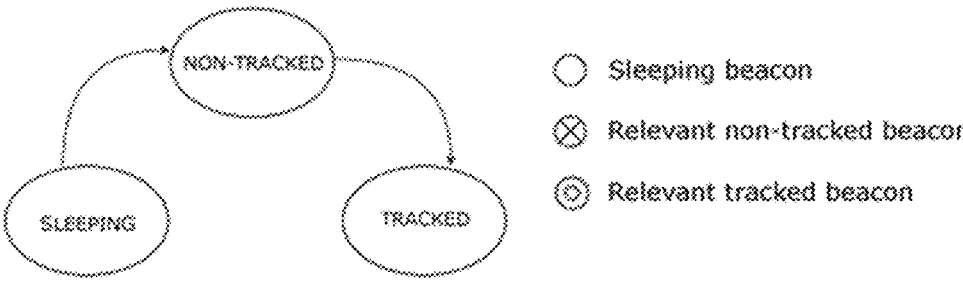
Figure 14B:
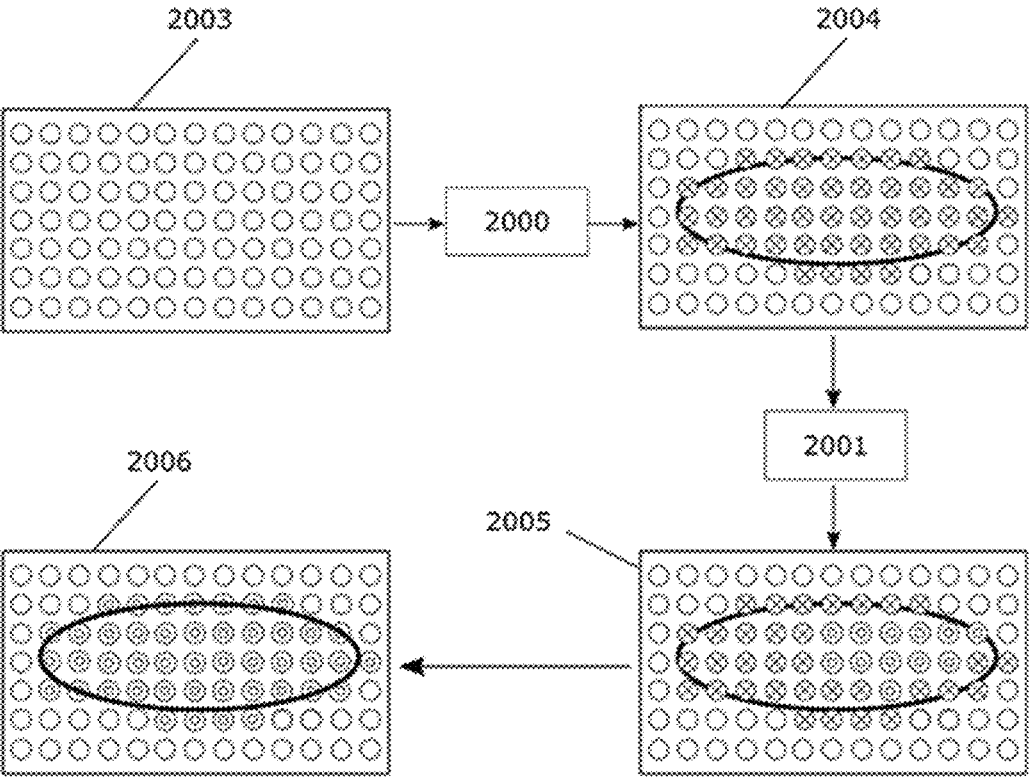

FIGS. 14A-B illustrates how the methods in FIGS. 12 and 13 interact to alter the state of the tracking beacons.

DETAILED DESCRIPTION OF THE INVENTION

The present invention corresponds to a computer-implemented method and system for training in visual technical inspection operations. Said invention uses augmented or virtual reality to generate simulations of various scenarios within a simulation environment, for example, the scene of a forensic investigation. Training in visual technical inspection requires simulating complex scenarios, as well as the use of various objects and chemicals for proper training that make it difficult to practice in real environments in a manner that is safe for users. Therefore, the present invention is designed to facilitate training in operations of this type, thus allowing easy reconfiguration of the scenario and providing unlimited training for users. Furthermore, the augmented or virtual reality system of this invention is such that it is portable, so that it can be conveniently transported. Hereinafter, a series of particular embodiments of the invention will be shown only in VR systems. However, these embodiments serve only as examples and are not limiting to the scope of the invention.

Figure 1:
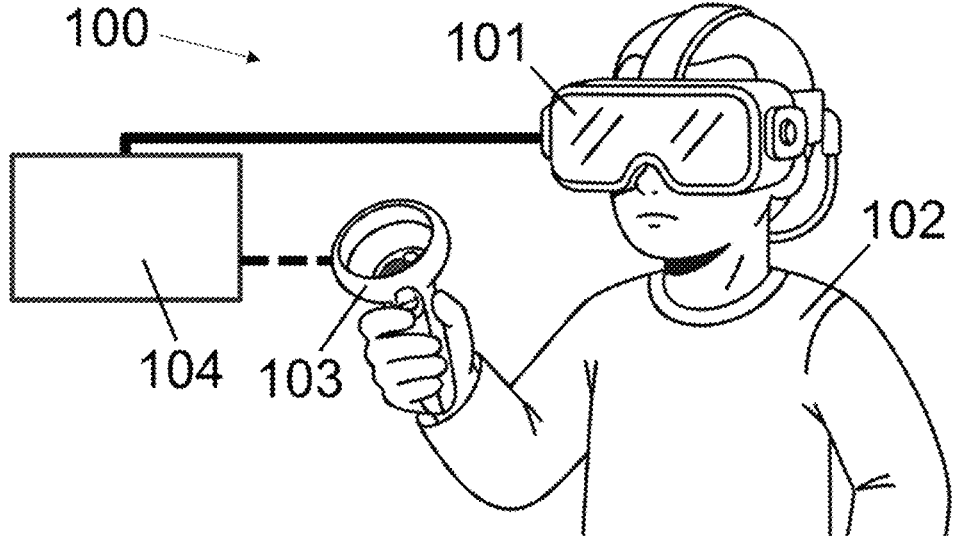
FIG. 1 shows an example of a simulation system according to an embodiment of the invention.

FIG. 1 shows a simulation system (100) suitable for simulating and training for visual inspection operations according to a particular embodiment of the invention. The system (100) includes a VR visual display equipment (101) configured to generate a simulation environment representing a physical space, and to show said simulation environment to a user (102). In particular, the visual display equipment (101) of FIG. 1 comprises VR glasses worn by the user (102). In other embodiments of the invention, the visual display equipment (101) comprises AR glasses, AR/VR helmets, any monitor or screen (for example, a screen of a computer, mobile device, tablet or television) that allows an AR/VR environment to be displayed.

In addition, the system (100) includes at least one selected from an actuator and a sensor, configured to record information about the actions performed by the user (102) in the physical space. In particular, the system (100) of FIG. 1 comprises a joystick (103) handle by the user (102). Other actuators/sensors compatible with the present invention may include haptic sensors, augmented reality flashlight, or tweezers. The actions of the user (102) recorded with the actuators/sensors like the joystick (103) of FIG. 1 represent interactions in the simulation environment generated with the visual display equipment (101).

The system (100) further includes a processing equipment (104) connected to the visual display equipment (101) and the actuators and/or sensors. The processing equipment (104) is used, together with the visual display equipment (101) and the actuators/sensors, in the method for simulating and training for visual inspection operations of the invention. To this end, the processing equipment (104) comprises a plurality of modules as it is explained in the following.

Figure 2:
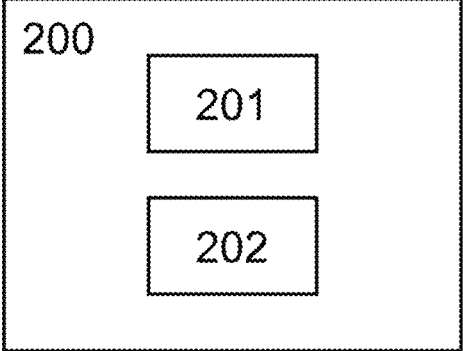
FIG. 2 shows a schematic representation of an example processing equipment according to an embodiment of the invention.

FIG. 2 shows a schematic representation of a processing equipment (200) according to an embodiment of the invention. Said processing equipment (200) comprises an information storage module (201) and an evaluation module (202). Preferably, the information storage module (201) comprises a database. The information storage module (201) is configured to store interactions performed by users of the simulation environment, and a sequence of operations used as a comparable reference. On the other hand, the evaluation module (202) is configured to compare the similarity between the reference sequence of operations and the operations performed by each user.

FIG. 3 shows a preferred implementation of the graphical interface associated with the system of the invention, comprising the virtual reality simulation environment (1) (in this case, a space with different doors) and an avatar (2) representing the user's hands. When the user clicks on the icon (3), a drop-down menu (4) opens in which the user can observe different virtual operations and tools (5) for interacting with the simulation environment (1). In this case, the menu (4) is used to open the camera functionality.

FIG. 4 represents the interface of the system with the options menu (4) dropped down when the user activates the functionality of acquiring one or more images of the simulation environment. In this case, the virtual tool (5) is a virtual photographic camera. The user has several configuration options for said camera, for example, various optical filters and types of image capture (tripod mode, panoramic mode or others). FIG. 4 also shows a virtual representation or miniature of the hardware used by the user to interact with the system, in this case a joystick (6) held in the user's hands. Preferably, the interface of the system shows the user information on what each of the buttons of the hardware used is for. In the specific case of FIG. 4, a first button on the joystick is used to take the photo, while a second button is used to change the style of photography (tripod, panoramic, or detail). Once the user is holding the camera in his/her hand, he/she can adjust the magnification (zoom) of the camera according to the point of view from which he/she observes the scene.

FIG. 5 shows how, once the configuration of the virtual photographic camera is chosen, the drop-down menu (4) closes to facilitate focusing and selection of the field of view to be captured by the photographic camera with the user's point of view.

The system of the invention may comprise a set of one or more virtual tools (5) suitable for performing visual inspection operations, so that the user can interact with other virtual objects (7) of the simulation environment (1) by means of said virtual tools (5). Among the virtual tools (5) the following are highlighted:

Virtual artificial illumination means (5'), comprising at least one of the following: visible light, infrared light or ultraviolet light tracking flashlight.

Virtual measuring means, comprising at least one photo evidence scale or gauge.

Virtual image acquisition means (a photographic camera).

Virtual magnetic elements, for example magnetic powders for developing fingerprints.

Means for handling virtual objects, comprising at least one of the following: brushes, swabs, developing reagents, supports for transfer and/or storage of virtual objects, comprising at least tape for collecting fingerprints or footprints.

Virtual containers suitable for the storage of one or more virtual objects, comprising at least one of the following containers: cardboard, plastic, Faraday cage or for bullet casings.

The virtual objects (7) used in the method and system object of the invention are not limited exclusively to objects simulating being evidence in a scenario, but comprise, among others:

Biological evidence, including at least one of the following: blood stains, fluids, dust, paint or fibers.

Chemical evidence: active, reactive.

Expert or forensic evidence: weapons, shells, flammable elements, etc.

Furniture.

One or more sets of clothes for the avatar (2), depending on the scenario simulated in the simulation environment (1).

Virtual signaling markers suitable for delimiting a subset of the simulation environment by means of operations of marking, comprising at least one of the following: alphabetical markers or beacons.

One of the main features of the invention consists of the ability to highlight certain virtual objects (7), such as evidence, by means of the use of virtual artificial illumination means (5') and virtual optical filters. FIG. 6 illustrates the functionality of simulating and training for visual inspection operations assisted by virtual artificial illumination means (5'), in this case a virtual flashlight. The correct operation of this feature requires the collaboration of two subsystems: resolution sequences and a plurality of pairs of illumination and optical filter types to be applied. The objective sought is to visually highlight (by simulating illumination effects or other suitable techniques) certain virtual objects (7) (for example, evidence) in the scene when suitable conditions are met (distance of observation with respect to the evidence, suitable direction of illumination, use of the right virtual tool, etc.). During the process of illuminating evidence, there will always be three high-level entities interacting:

Virtual artificial illumination means (5') (an illuminator or flashlight), which is used by the user to illuminate the evidence. The illuminator allows applying various illumination patterns having a configurable duration. Said illuminator must include at least a volume (8) of action and a light-filter pair. The volume (8) of action is defined as the volume of the simulation environment in which the illuminator deploys its effect, and depends on the specific virtual tool (5). In the case of the flashlight (see FIG. 6), the volume (8) of action is a cone with the end at the focus of the flashlight, having a parameterized length and radius depending on the distance of observation to said volume. Moreover, the light-filter pair represents the configuration of the illuminator and comprises the type of illumination chosen and the optical filter applied. At least one light-filter pair must be present in the virtual artificial illumination means (5'), although it is possible to design virtual tools (5) comprising different pairs together with specific pair selection mechanisms. For example, the flashlight comprises various types of light (infrared, visible, ultraviolet) as well as various optical filters.

Illuminated virtual object (7) (for example, evidence), which is the virtual entity that is to be graphically highlighted or revealed to the user when a correct light-filter pair is applied. In the case of evidence, the correct light-filter pair is linked to the state of a resolution sequence. The resolution sequence is the set of actions linked to the evidence that will or will not be triggered depending on the type of interaction with a virtual tool (5). During the processing of evidence, the resolution sequence associated with the evidence receives the interactions with the virtual tools (5) and advances through its different states, as will be seen below.

Illumination effects, comprising modifications in certain characteristics of one or more virtual objects (7), for example, their textures, materials, changes in visibility, decals or combinations of the above.

By combining the three previous elements (illuminator, illuminated virtual object and illumination effects) it is possible to construct virtual objects (7) that are illuminated by different light-filter pairs.

The use of the virtual artificial illumination means (5') comprises the following steps:

The virtual artificial illumination means (5') (illuminator) are activated.

The illuminator checks for the presence of virtual objects (7) that can be illuminated within its volume (8) of action.

Upon locating a virtual object (7) that can be illuminated, the illuminator communicates with said virtual object (7) to notify it of its presence and the light-filter pair with which it is emitting light.

The illuminated virtual object (7) checks if the received light-filter pair is correct and, if necessary, applies the associated illumination effects it has. When the illuminator does not have the correct light-filter pair, the virtual object (7) does not react.

FIG. 7 corresponds to the functionality of visual inspection assisted by artificial illumination, wherein the flashlight is applied to a surface of the simulation environment, in this case a table. It can also be seen how the user is offered a miniature of the joystick (6) including the functionality associated with each of the buttons of said hardware (for example, turn on or turn off the flashlight, or change the optical filter of said flashlight) as feedback so that the user of the system knows what options are available for interaction. The projection of the volume (8) of action on the table surface corresponds, in this case, to an ellipse, which is discretized as a plurality of points. In this FIG. 7, the configuration of the flashlight is not suitable (because the angle and distance of observation with respect to the surface is not suitable), so the user is not able to locate any evidence on the surface.

FIG. 8 represents the same scenario of FIG. 7, with the difference that the user has modified the configuration of the flashlight. In this particular case the configuration comprises setting the distance, the type of light and the suitable illumination filters to illuminate the object (print), although other parameters could be set, such as the angle at which the object has to be illuminated. When the established configuration is correct, the flashlight allows revealing a hidden virtual object (7) (a fingerprint) in the projected ellipse corresponding to the volume (8) of action.

Another functionality of the system of the invention comprises precision grasping, which is used primarily for the handling of certain virtual objects (7), such as evidence. Due to the high precision required, the grasping control and connection with the virtual object (7) is performed with aspects that differ from grasping systems in usual virtual or augmented reality systems. The main differences with respect to said more common systems are:

Region of influence. Unlike other common AR/VR systems, the region of influence is established in a volume that roughly envelops the tip of the index finger of the hand of the avatar (2). This volume is controlled using a collider that is invisible to the user and the size and position of which are suited to the virtual object (7) and to the resolution required by the operation of grasping said object. Colliders are components that define the shape of an object for the purpose of simulating a collision.

Reaction to the grasping. A rigid physical connection between the virtual object (7) and the center of mass of the hand of the avatar (2) representing the user is generated at the moment of grasping. Thus, the position of all points of the virtual object (7) and/or virtual tool (5) relative to the hand holding it is maintained during grasping, which ensures precise control by the user of which parts of the virtual object (7) are in contact with the virtual hand of the avatar (2).

This mechanism of reaction to the precision grasping reliably represents the position of the user's fingers on the virtual hand of the avatar (2). Optionally, this precision grasping system uses information recorded by one or more sensors (for example, haptic gloves worn by the user in the physical world).

FIG. 9 represents the interface of the system for simulating operations of marking paths or areas of interest in the simulation environment (1). Specifically, the path corresponds to a passageway defined by means of a plurality of marking points wherein a plurality of virtual objects (7) are placed as virtual signaling markers or beacons. The limits of said passageway are delimited by a dashed line shown to the user. The virtual tool (5) in this case is tape, which would be used in a real scenario to cordon off the area and delimit the passageway. Said paths can be represented in an environment (1) that simulates an indoor space (for example, a room) or outdoor space (for example, on a street, road, forest, etc.).

The method for creating spaces within the simulation environment (1) shown in FIG. 10 is fundamental to the proper functioning of the invention. This method comprises performing the following steps:

Initializing (1000), wherein a scenario is selected and/or configured, and several parameters are defined, such as the position of said scenario within the simulated environment (1) and the objects (7) included in said scenario.

Verifying (1001) whether said scenario is closed, after which two alternative cases may occur:

a) It is an enclosed space, in which case an existing enclosure to which the space will belong is selected (1002) or, alternatively, generated (1003) if it is not going to belong to any of the available enclosed scenarios. Then the scenario will be located (1004) in its position within the three-dimensional simulation environment.

b) It is not an enclosed space, in which case the space will be located (1004) directly in its position within the three-dimensional simulation environment (1).

Checking (1005) if more spaces need to be created. If they do, it returns to initializing (1000). If no more spaces are required, it ends (1006).

Another object of the present invention is the method for configuring spaces created within the simulation environment (1). As shown in FIG. 11, starting from an initial space (1007) (comprising a subset of the simulation environment (1)), a final space (1008) is obtained by applying a first algorithm (1009). Said first algorithm (1009) comprises these steps:

Initializing, starting from a three-dimensional model of an initial space (1007) and selecting parameters for the construction of a main tracking matrix (1010), formed by a plurality of beacons. Among said parameters, the resolution stands out, understood as the number of beacons to cover a unit of surface or length of the simulation environment (1) and the proximity between consecutive beacons.

Generating the main tracking matrix (1010) with the parameters of the previous step of initializing.

Whether manual adjustments to the main tracking matrix (1010) are required, such as adding or removing beacons, or whether secondary tracking matrices need to be added, is analyzed. For example, a main tracking matrix may be set on the floor of the scenario, whereas secondary tracking matrices may be necessary when representing the tracking of discontinuous areas of the simulation environment (1).

If from the analysis of the preceding step the need for adjustments arises, said adjustments are applied to the main tracking matrix (1010), and the main tracking matrix (1010) is superimposed on the initial space (1007) to generate the final space (1008). Where appropriate, the secondary tracking matrices would also be superimposed. When no adjustments are necessary, the main tracking matrix (1010) is directly superimposed on the initial space (1007) to generate the final space (1008).

The method ends (1011).

Another aspect of the invention comprises the method for tracking areas of interest of the simulation environment (1) by means of using virtual tools (5). Said method for tracking in turn comprises two different algorithms:

A second algorithm (2000) for delimiting areas of interest (see FIG. 12) within the simulation environment (1).

A third algorithm (2001) for using virtual tracking tools (see FIG. 13) to interact with the areas of interest.

These two algorithms (2000, 2001) will be discussed in detail below.

FIG. 12 shows the second algorithm (2000) for delimiting paths or areas of interest within the simulation environment (1) (either in an environment (1) simulating an indoor or outdoor space), which comprises these steps:

Initializing (1012), comprising the delimitation by the user of a subset (path or area of interest) of the simulation environment (1).

Analyzing (1013) the type of area of interest:

a) If it is an open area, (1014) the area delimiter is used to mark an arbitrary area and (1015) the area of interest is considered to be completed.

b) If it is a closed area, the access points to that area are marked (1016) using a virtual object (7) area delimiter. Then, whether all the access points have been marked is verified (1017) and, if they have been, the area of interest is considered (1015) completed. If all the access points of the area of interest are not marked, the area delimiter (1018) is used until all the access points have been marked.

To differentiate whether an area should be open or closed, criteria can be pre-established and incorporated into the simulator logic. For example, closed areas are designed for smaller areas in which it is possible to seal off an access point. In contrast, open areas are those large regions of the scenario in which it is not possible to control access by sealing a single access point, and therefore other techniques are required to delimit a space (for example, generating a passageway or delimiting a contour with a plurality of beacons).

Whether more areas of interest need to be added is checked (1019). If they do, the method returns to the step of analyzing (1013). If they do not, the second algorithm (2000) ends (1020).

FIG. 13 details the operation of the tracking tool (5) and its interaction with the beacons. The steps to execute this third algorithm (2001) are:

Initializing (1021), comprising selecting the virtual tracking tool (5) and picking it up with the hand of the avatar (2).

Tracking (1022). This step, which will be seen below in detail, is performed from the time the tool (5) is selected until it is put down.

Moving (1023) the tracking tool (5) in the simulation environment (1) to determine which beacons of the volume (8) of action are selected.

Releasing (1024) the tool (5), for example, by storing it in a virtual briefcase carried by the avatar (2) or by throwing it on the floor of the simulation environment (1).

The third algorithm (2001) ending (1025), which also stops the step of tracking (1022) regardless of how far the execution thereof has progressed.

In turn, the step of tracking (1022) comprises performing the following steps:

Initializing (1026) the virtual tracking tool (5), comprising defining its configuration and volume (8) of action, among other parameters.

Searching (1027) for beacons within the volume (8) of action.

Checking (1028) whether the virtual tool (5) interacts with each of the tracking beacons within the volume (8) of action, which gives rise to two cases:

a) If the virtual tool (5) does not interact with the beacon, it returns to the search (1027).

b) If there is interaction of the virtual tool (5) and the beacon, the beacon is marked (1029) as tracked and the method returns to the step of searching (1027).

Ending (1030), which forces the step of ending (1025), since they are synchronized. The ending (1030) is performed independently of the moment of executing the step of tracking (1022).

FIGS. 14A-B illustrate the functionality of tracking, using the algorithms (2000, 2001). The life cycle (resolution sequence) of the beacons comprises three states, which are sequentially traversed depending on the interaction with the virtual tool (5): sleeping beacon, relevant non-tracked beacon and relevant tracked beacon (see FIG. 14A). In FIG. 14B it is assumed that there is a single tracking matrix (2003), wherein initially all the beacons in the simulation environment (1) are sleeping, not reacting to any virtual tool (5). After the execution of the second algorithm (2000) for delimiting areas of interest, a new tracking matrix (2004) is generated wherein several beacons are considered as relevant non-tracked beacons, since they are in the volume (8) of action of the tool (5) (in this case, the beacons comprised in the ellipse shown in FIG. 14B). As the user moves the virtual tool (5) in the simulation environment (1), several of the relevant beacons in the tracking matrix (2005) change to the tracked state. The tracking ends when all relevant beacons have been inspected by means of the third algorithm (2001).

The invention claimed is:

1. A method for simulating and training for visual inspection operations in virtual or augmented reality environments, suitable for use in simulating operations of investigation reports, evidence inspection or forensic examination performed in a physical space, comprising the operation of a simulation system, said simulation system comprising:

a processing equipment comprising an information storage module and an evaluation module;

a visual display equipment connected to the processing equipment and configured to generate a simulation environment representing the physical space, and to show said simulation environment to a user; and at least one selected from an actuator and a sensor, connected to the processing equipment and configured to record information about actions performed by the user in the physical space, wherein said actions represent interactions in the simulation environment;

wherein the method comprises performing the following steps:

a) generating, with the visual display equipment, the simulation environment;

b) defining at least one avatar of the user in the simulation environment by using the visual display equipment;

c) defining a set of objects in the simulation environment of the visual display equipment, wherein said objects are representations of physical objects, and wherein, by using the at least one selected from the actuator and the sensor, the avatar of the user can interact with one or more of said objects of the simulation environment, wherein the interactions of the avatar with the one or more objects of the simulation environment are associated with actions performed by the user in the physical space;

said method being characterized in that it further comprises performing the following steps:

d) defining, in the processing equipment, a reference sequence of operations, and storing the reference sequence of operations in the information storage module, wherein the reference sequence of operations is associated with the interaction, by using the at least one selected from the actuator and the sensor, of the avatar with one or more objects of the simulation environment, and wherein said operations comprise at least one or more direct interactions with an object, one or more indirect interactions with an object, one or more operations of marking the simulation environment, and an order of execution of two or more operations of the reference sequence of operations;

e) showing to the user, with the visual display equipment, the simulation environment, the user performing actions in the physical space, and acquiring, with the at least one selected from the actuator and the sensor, information about the actions performed by the user, wherein said actions are associated with a sequence of operations associated with the interaction, by using the at least one selected from the actuator and the sensor, of the avatar with one or more objects of the simulation environment, wherein said operations comprise at least one or more direct interactions with an object, one or more indirect interactions with an object, one or more operations of marking the simulation environment, and the order of execution of two or more operations of the sequence of operations;

f) detecting, with the at least one selected from the actuator and the sensor and the visual display equipment, the sequence of operations performed by the user;

g) recording, with the information storage module of the processing equipment, the sequence of operations performed by the user, and calculating, with the evaluation module of the processing equipment, the similarity thereof with the reference sequence of operations.

2. The method according to claim 1 comprising calculating with the processing equipment, a meta-path in the simulation environment comprising a set of points of said simulation environment at which the user has performed one or more operations in the virtual space, or a set of points through which the user's avatar has moved in the virtual space.

3. The method according to claim 2, further comprising at least one selected from:

graphically representing the meta-path in the simulation environment using the visual display equipment;

recording one or more user's operations in the simulation environment.

4. The method according to claim 1, comprising:

generating a random or predetermined distribution of a set of objects in the simulation environment by using the processing equipment; wherein said objects comprise one or more properties, one of said properties consisting of the visibility or not of said virtual object in the simulation environment; and representing with the visual display equipment and according to the distribution generated in the preceding step, a subset of objects in the simulation environment that are visible.

5. The method according to claim 1 for simulating and training for visual inspection operations assisted by artificial illumination, comprising:

calculating with the processing equipment, the distance and/or direction of observation from the user's avatar to an object;

calculating with the processing equipment, the distance and/or direction of illumination from a virtual artificial illuminator carried by the user's avatar to the object; wherein said virtual artificial illuminator comprises an artificial illumination source suitable for illuminating the simulation environment and, optionally, one or more optical filters; and representing with the visual display equipment, an illumination result in the simulation environment selected from a plurality of results dependent on the distance and/or direction of observation and the distance and/or direction of illumination.

6. The method according to claim 1 for simulating operations of marking paths in a virtual environment, comprising:

h1) defining with the interaction of the avatar with the simulation environment, a plurality of virtual signaling points in said simulation environment;

h2) representing, at the virtual signaling points defined in the preceding step, objects that are corresponding signaling markers, wherein said objects have one or more physical interaction properties in the simulation environment;

h3) defining a virtual path between two or more points of the simulation space; and h4) graphically representing said virtual path as a meta-path in the simulation environment that delimits a subset of points of the simulation space.

7. The method according to claim 6, further comprising detecting with the processing equipment, the handling of objects present in the virtual path, wherein said handling occurs when the virtual path overlaps the position of an object or with the user's avatar.

8. The method according to claim 1 for simulating operations of taking at least one selected from fingerprints and/or footprints in a virtual environment, comprising:

applying one or more objects, said objects comprising at least one virtual artificial illuminator and/or virtual tools for handling objects, on a subset of points of the simulation environment to modify the visibility of a new object located in said subset of points of the simulation environment; and optionally, transferring said new object to storage containers for objects.

9. The method according to claim 1 for simulating operations of acquiring one or more images and metadata from the simulation environment, comprising:

i1) selecting at least one of the objects as image acquisition device;

i2) configuring a type of image, and optionally an optical filter, and applying said configuration to the image acquisition device;

i3) positioning the avatar at a distance from the subset of the simulation environment, and with the direction of observation with which the image(s) will be taken;

i4) capturing an image of the subset of the simulation environment that is in the field of view of the image acquisition device configured according to step i2); wherein said image comprises metadata of the objects in the image;

i5) evaluating the image captured in the preceding step according to one or more quality criteria set by the user and metadata of the objects of the image captured in step i4); and i6) repeating steps i1)-i4) if the evaluation of step i5) does not exceed the quality criteria.

10. The method according to claim 1, further comprising generating a score of the user's performance depending on the similarity of the user's operations and the reference sequence of operations.

11. The method according to claim 1, wherein a plurality of users interacting cooperatively or not in the same simulation environment are further defined, wherein a role is optionally assigned to each user and wherein the sequence of operations comprises one or more interactions allowed for each user with respect to the objects and/or other users depending on said role; all the users in said simulation environment being synchronized.

12. The method according to claim 1, wherein the processing equipment comprises at least one selected from:

an audio device for at least one selected from reproducing and recording audio, for the interaction of the user with the simulation environment;

a display for external viewing of the simulation environment for the viewing of said environment and of the operations performed by a user to other different users;

a feedback module for recording the information obtained from the users during the performance of operations in the simulation environment; and a communications device for transmitting at least one selected from information stored by the processing equipment and information processed by the processing equipment, to external devices or remote locations through telematic networks.

13. The method according to claim 12, wherein the feedback module further performs the following steps:

calculating a score depending on the user's recorded information, according to the similarity between reference patterns and operations performed by the user;

providing a plurality of indications to the user of those interactions different from those comprised in the reference sequence of operations; said indications comprising at least one of the following: time used for interactions with the objects, total time used for performing the operations, incorrect order of performing the sequence of operations, number of objects stored.

14. The method according to claim 1, wherein the system further comprises another module for recording and reproducing information, wherein said another module performs the following steps:

generating a record from the point of view of one or more users of the simulation environment, of the set of operations performed by one or more users of the simulation environment;

optionally at least one selected from synchronizing said record with the set of operations performed by one or more users of the simulation environment, and reproducing said record.

* * * * *